United States Patent [19]

Abouzahr et al.

[11] Patent Number: 5,698,057
[45] Date of Patent: Dec. 16, 1997

[54] METHOD OF MANUFACTURING A COMPOSITE STRUCTURAL MEMBER FOR AN AUTOMOBILE

[75] Inventors: Saad M. Abouzahr, Highland; Nippani R. Rao, Farmington Hills; Chao H. Mao, Rochester Hills, all of Mich.

[73] Assignee: Chrysler Corporation, Auburn Hills, Mich.

[21] Appl. No.: 697,519

[22] Filed: Aug. 26, 1996

[51] Int. Cl.$^6$ .................................................. E06B 3/00
[52] U.S. Cl. ...................... 156/242; 156/245; 156/307.1; 428/14; 428/122; 428/358
[58] Field of Search .......................... 428/122, 358, 428/14, 31; 156/242, 245, 307.1

[56] References Cited

U.S. PATENT DOCUMENTS

| | | |
|---|---|---|
| 4,884,380 | 12/1989 | Yada et al. ................ 428/122 X |
| 4,898,760 | 2/1990 | Halberstadt et al. ............ 428/122 |
| 5,538,777 | 7/1996 | Pauley et al. ................. 428/122 |

*Primary Examiner*—Henry F. Epstein
*Attorney, Agent, or Firm*—Lawrence J. Shurupoff

[57] ABSTRACT

A method of making a lightweight reinforced composite framing member for an automotive vehicle comprises forming a foam core of resinous plastic material in the general shape and configuration of the composite framing number. A plurality of cover strips made of a sheet molding compound containing a thermosetting material is molded in an uncured or only partially cured, flexible, tacky condition and then pressed on the core in a manner covering substantially the entire outer surface of the core. The assembly consisting of the core with the cover strips adhered thereto is placed in a mold and by the application of heat and pressure the cover strips are caused to flow into a uniform and continuous sheath bonded on the core in the configuration of the reinforced composite framing member. While in the mold, the sheath is cured and set, completing the formation of the framing member.

8 Claims, 4 Drawing Sheets

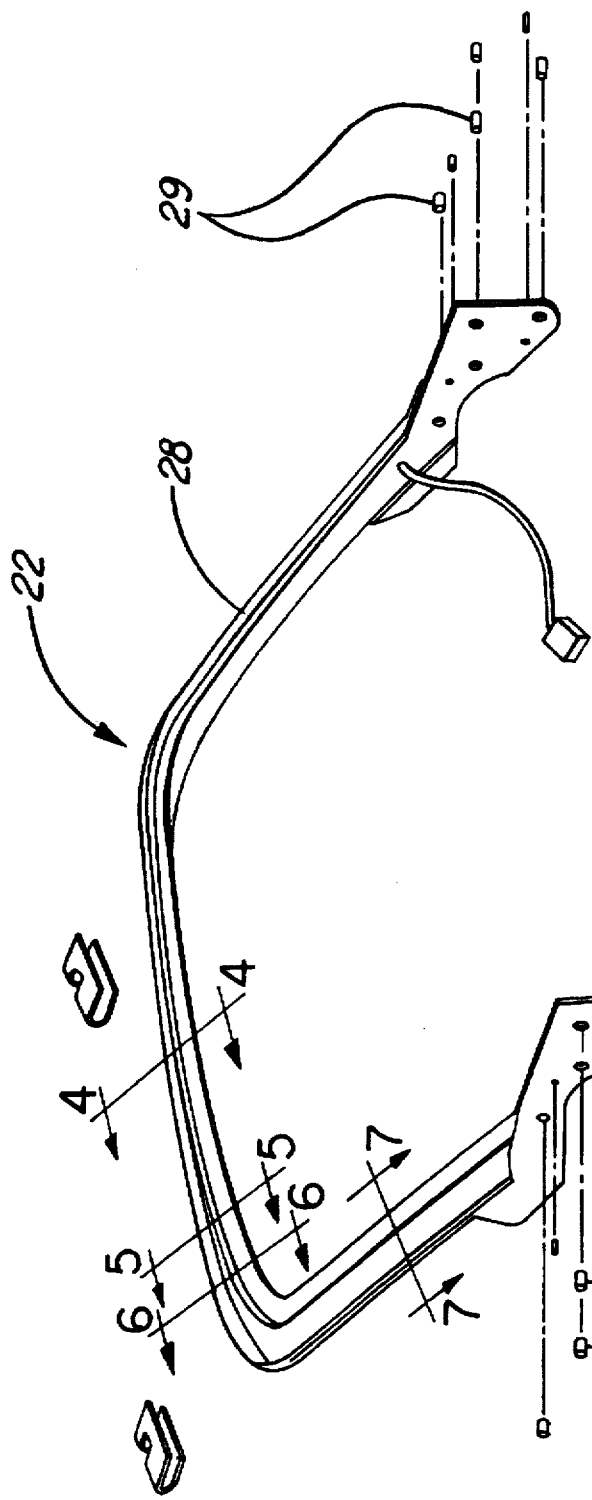
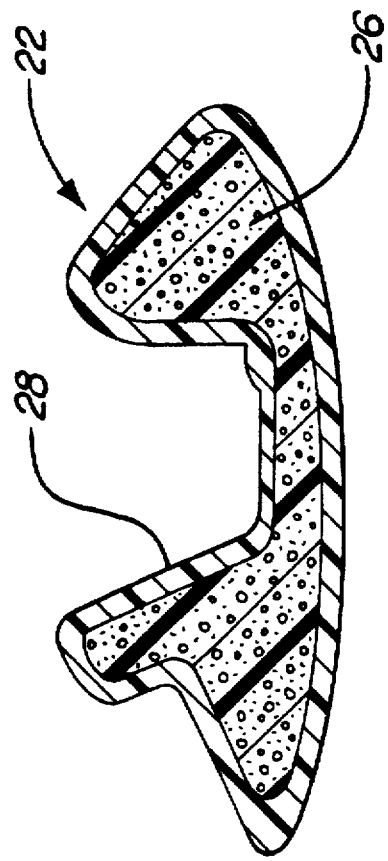
FIG.3
FIG.4

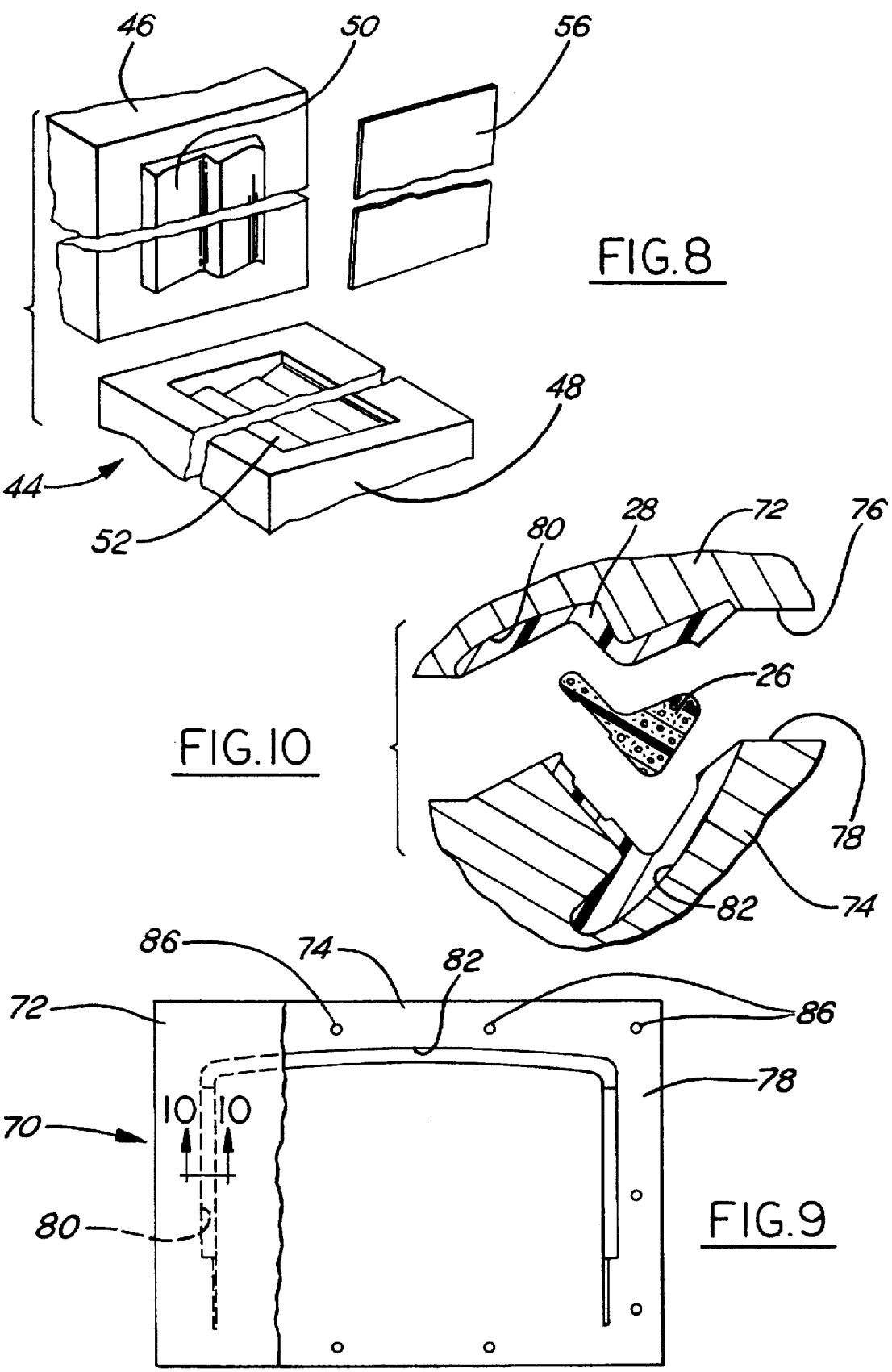

METHOD OF MANUFACTURING A COMPOSITE STRUCTURAL MEMBER FOR AN AUTOMOBILE

FIELD OF INVENTION

This invention relates generally to a method of making a structural member and more particularly to a method of making a reinforced composite structural framing member for the windshield of an automotive vehicle.

BACKGROUND AND SUMMARY OF THE INVENTION

Presently, the frame for the windshield of an open top or convertible automotive vehicle is made of metal such as steel, often covered with a plastic trim material. This windshield frame is expensive and heavy, weighing up to 40 or 50 pounds.

The present invention involves a method of forming a lightweight, reinforced, composite framing member preferably employing plastic materials. The composite framing member preferably comprises a foam core with a sheet molding compound (SMC) also preferably of plastic material molded over the foam core.

The core may be made of various rigid foam materials. The SMC material comprises a thermosetting plastic resin, and may include an inorganic filler, a release agent, a catalyst, and fiber reinforcement.

In carrying out the method of this invention, the core is preferably molded in one piece. The SMC material in sheet or strip form is applied to the core over its full length. Since the SMC material at this stage in the process is uncured or at most only partially cured, it will be tacky and adhere to the core, so that the core is encased in the SMC material.

This composite is then placed in a mold where the final reinforced, composite structural framing member is formed under heat and pressure. In this final molding step, the SMC material cures and sets and becomes bonded to the core and forms a complete outer covering for the core without any visible seams.

One object of this invention is to provide a method of making a lightweight structural member such as the framing for the windshield of an automotive vehicle, having the foregoing features and attributes.

Another object is to provide a method of making a composite structural member which is capable of being quickly and easily performed.

These and other objects, features and advantages of the invention will become more apparent as the following description proceeds, especially when considered with the accompanying drawings.

BRIEF DESCRIPTION OF THE DRAWINGS

FIG. 3 is a perspective view of the framing or structural member ready for installation around the windshield of the automobile.

FIG. 4 is a sectional view taken on the line 4—4 in FIG. 3.

FIG. 8 is an exploded view with parts broken away showing the upper and lower mold halves which cooperate in forming a cover strip from a sheet of SMC material.

FIG. 9 is a top view with parts broken away showing a mold for receiving the core with the cover strips adhered thereto in which the cover strips are cured and molded around the core to the final configuration of the composite framing member.

FIG. 10 is an exploded view in section, taken on the line 10—10 in FIG. 9.

DETAILED DESCRIPTION OF THE PREFERRED EMBODIMENT

Figure 1:
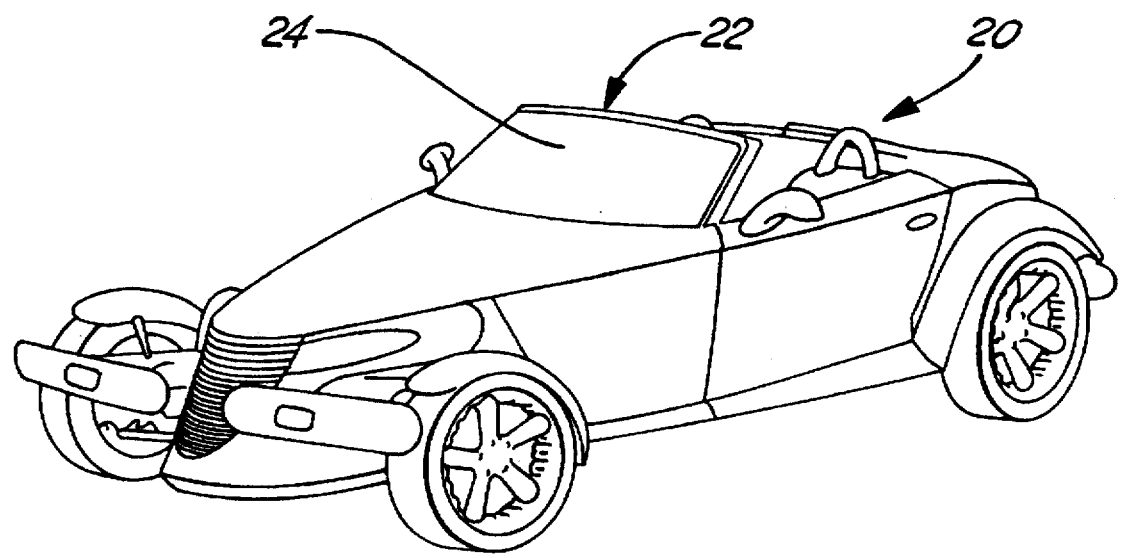
FIG. 1 is a perspective view of an open top automobile having a reinforced, composite structural framing member for the windshield constructed in accordance with the method of this invention.

Referring now more particularly to the drawings, the open top automobile 20 shown in FIG. 1 has a reinforced composite structural framing member 22, which is generally U-shaped and extends around the two sides and top of the windshield 24. The framing member 22 is constructed by the method of this invention.

The reinforced composite framing member 22 comprises a core 26 and an outer sheath 28 encasing the core. Fasteners 29 secure the reinforced comppsite framing member 22 to the vehicle frame.

The core 26 is made of a lightweight rigid, resinous, foam material. Suitable materials are urethane, epoxy, polypropylene or polyethylene. Urethane has proven very satisfactory and is relatively inexpensive. The sheath 28 is made of a sheet molding compound (SMC), the main constituent of which desirably is a thermosetting plastic, such, for example as a polyester or epoxy resin. The SMC material in a preferred embodiment also includes reinforcing glass or carbon fibers having a length ranging from approximately 0.25" to approximately 2". The fiber can also be continuous. The SMC material may also include inorganic fillers such as calcium carbonate, talc, or mica, a release agent such as zinc stearate, and a catalyst. In a preferred embodiment, the fibers will comprise approximately 15% to 50% by weight of the total SMC material. The inorganic filler to resin ratio is preferably between approximately 1.5 to 1 and approximately 1.75 to 1.

Figure 2:
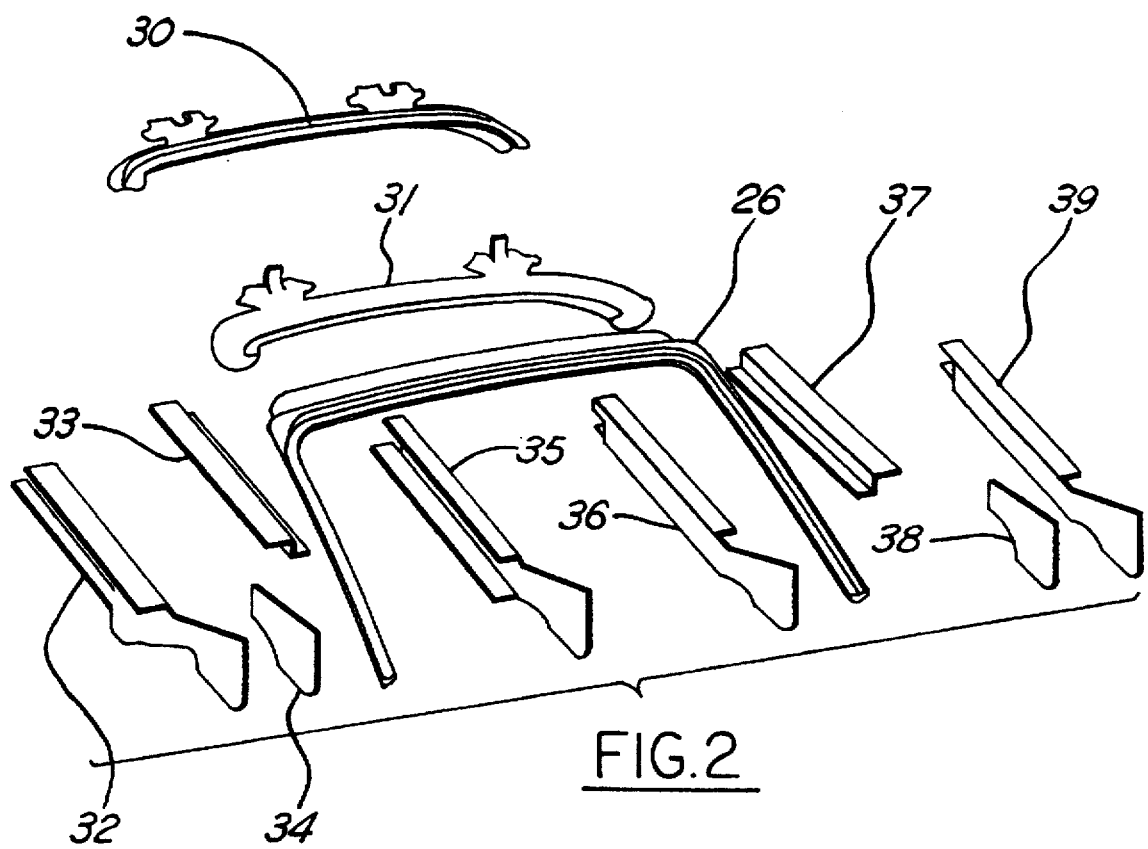
FIG. 2 is an exploded view of the framing or structural member, showing the cover strips for the core separated therefrom.
Figure 5:
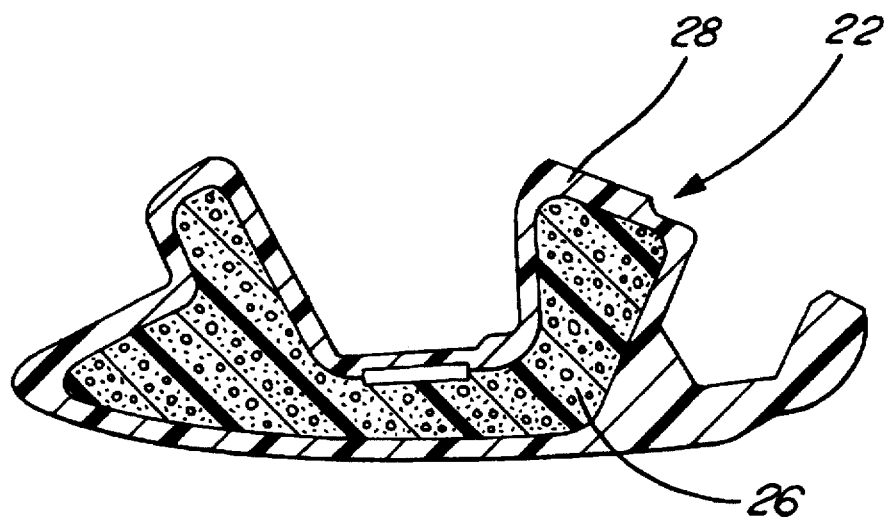
FIG. 5 is a sectional view taken on the line 5—5 in FIG. 3.
Figure 6:
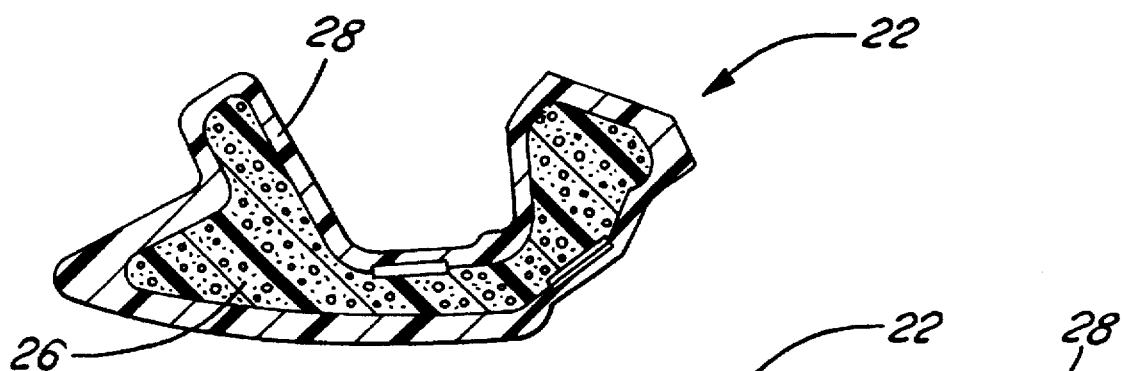
FIG. 6 is a sectional view taken on the line 6—6 in FIG. 3.
Figure 7:
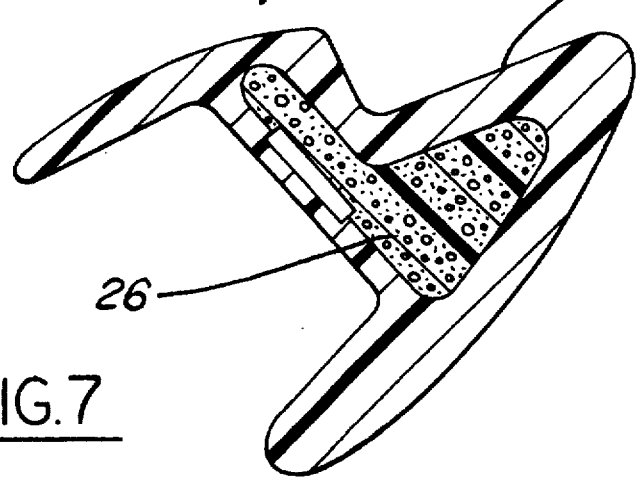
FIG. 7 is a sectional view taken on the line 7—7 in FIG. 3.

The core 26 may be injection molded in one piece to the desired configuration and cross-section throughout its full length. The overall form and shape of the core matches that of the reinforced composite framing member 22 although the cross-sectional configuration may be somewhat different from that of the reinforced composite framing member at various points along its length as is apparent from a consideration of FIGS. 4–7. The SMC sheath 28 for the core is formed from a plurality of separate cover strips identified in FIG. 2 by the reference numerals 30–39. The configuration of the core at various points along its length is often so complicated and intricate that the SMC material must initially be made in several pieces. Both sides of the core must be covered to provide a complete encasement. Thus, there will always be at least two cover strips or pieces of the SMC material to cover both sides, or to cover front and back, but because of the often complicated and intricate design of the core, many more pieces may be necessary as will be understood and as will be seen in FIG. 2.

The SMC cover strips 30–39 are initially formed and separate molds are usually needed for the several different pieces of strip material because they often differ in configuration one from another. FIG. 8 shows an open mold 44 with separate upper and lower mold halves 46 and 48. When these mold halves are brought together, the male and female mold formations 50 and 52 of the upper and lower mold halves together define a cavity in which a relatively thin sheet of SMC material identified by the numeral 56 maybe molded to provide a cover strip of the desired configuration. Molding may be carried out at room temperature at 20–150 psi in only a matter of seconds. Other molds similar to mold 44 but differing in the configuration of the male and female mold formations will be required to form cover strips having different configurations.

The resulting molded cover strips coming out of the mold 44 and other similar molds are uncured or only partially cured and tacky or sticky, and flexible or even floppy.

After the several cover strips 30–39 are molded to the desired configuration, which is preferably somewhat like the desired configuration they will have when they form the exterior or exposed surface of the composite reinforcing framing member 22, they are manually pressed against the core 26 in the positions they will assume in the final end product. Together, the applied cover strips approximate the configuration of the reinforced composite framing member 22. The tacky cover strips 30–39 will stick to the core and substantially completely encase the core but, being still not cured or not fully cured and highly flexible, there will be seams or ridges showing where the adjacent cover strips abut one another. The application of the cover strips to the core should take place relatively soon after the cover strips are molded, to prevent them from sagging or losing their shape. This tendency to sag or change shape can be inhibited by refrigerating the cover strips.

The assembly consisting of the foam core 26 with the cover strips 30–39 manually and adhesively applied to the surface thereof is then placed in the mold 70 shown in FIG. 9 which consists of an upper mold half 72 and a lower mold half 74. The abutting flat surface portions 76 and 78 of the mold halves are formed with mating recesses 80 and 82 which together define a mold cavity in the U-shape of the reinforced composite framing member 22 to be formed therein and having the detailed configuration of the reinforced composite framing member throughout its length. The mold halves 72 and 74 are closed with the assembly of the core 26 and cover strips 30–39 in place in the mold cavity, and by the application of pressure and sufficient heat to cure the cover strips, the final end product, that is, the reinforced composite framing member 22 with core 26 encased in sheath 28, is completely formed. The pressure imposed on the assembled core and cover strips in the mold 70 may be in a range of about 200 to 1500 psi. The mold is preferably heated by heating elements 86 to heat the core and cover strips to a temperature in a range of about 250° F. to 300° F., assuming the thermosetting resin in the SMC material is one of those previously identified. The time required to cure the SMC material and complete the molding operation in the mold 70 is typically only 2–3 minutes. The cover strips while in the mold flow together to form the continuous sheath 28 without seams or ridges where the cover strips abut. The sheath is fully cured in the mold, takes a permanent set, and becomes bonded to the core.

FIG. 10 is an exploded view to better illustrate the core and cover strip pieces of the framing member 22 and their relationship to the mold parts 72 and 74. The cover strips are, of course, adhesively attached to the core when the core and cover strip assembly is placed in the mold, and are molded into the sheath and bonded to the core during the molding operation.

When the mold 70 is opened and the completely formed reinforced composite framing member 22 is taken from the mold, the sheath 28 covering the core 26 provides a continuous unitary encasement of the core and presents a smooth and attractive decorative appearance.

What is claimed is:

1. A method of making a generally U-shaped, lightweight reinforced composite framing member for fitting around the side and top edges of the windshield of an automotive vehicle from a plurality of separate, individual parts comprising the steps of:

(a) molding a foam core of resinous plastic material in the general shape and configuration of the composite framing member, (b) molding of a compound comprising a resinous thermosetting material two or more cover strips in a less than fully cured, flexible, tacky moldable condition and of a size and general configuration which when pressed on said core will cover substantially the entire outer surface of said core, (c) pressing and adhering the flexible, tacky moldable cover strips on said core to form a core and cover strip assembly in which the cover strips cover substantially the entire outer surface of said core, and together approximate the configuration of the reinforced composite framing member and (d) placing the assembly in a mold and applying heat and pressure to the assembly to cause said cover strips to flow into a uniform and continuous sheath on said core in the configuration of the reinforced composite framing member and then to cure and set the same thereby to complete the formation of the reinforced composite framing member.

2. A method as defined in claim 1, wherein said compound also comprises reinforcing fibers.

3. A method as defined in claim 2, wherein said fibers are carbon fibers.

4. A method as defined in claim 2, wherein said fibers are glass fibers.

5. A method as defined in claim 1, wherein said thermosetting material is selected from the group consisting of polyester and epoxy resins.

6. A method as defined in claim 1, wherein said core is made of a material selected from the group consisting of urethane, polypropylene, polyethylene, and epoxy.

7. A method as defined in claim 1, wherein said thermosetting material is selected from the group consisting of polyester and epoxy resins, and said compound also includes an inorganic filler, a release agent, a catalyst and reinforcing fibers selected from the group consisting of carbon fibers and glass fibers.

8. A method as defined in claim 7, wherein said core is made of a material selected from the group consisting of urethane, polypropylene, polyethylene and epoxy.

* * * * *